May 27, 1958     W. E. GLASSBURN     2,836,767
UNBALANCED-FAULT GENERATOR-PROTECTION
Filed Feb. 10, 1953

INVENTOR
William E. Glassburn.
BY *O. B. Buchanan*
ATTORNEY

United States Patent Office 2,836,767
Patented May 27, 1958

2,836,767

UNBALANCED-FAULT GENERATOR-PROTECTION

William E. Glassburn, Bloomfield, N. J., assignor to Westinghouse Electric Corporation, East Pittsburgh, Pa., a corporation of Pennsylvania Application February 10, 1953, Serial No. 336,101

22 Claims. (Cl. 317—13)

My invention relates to protective relaying means, and it has particular relation to the protection of generators, and other synchronous machines, against unbalanced currents.

Heretofore, many elaborate protective relaying-means have been developed, and extensively used, for the fault-protection of transmission lines, transformers, buses, and generators. Generators have been protected against faults within the generator, and other dangerous conditions such as loss of excitation, loss of the prime mover, and perhaps other conditions. Heretofore, however, nothing has been done to protect generators against damage resulting from the effects of sustained negative-sequence fault-currents in causing rotor-surface heating, resulting from double-frequency rotor-currents flowing in the surface-areas of the rotor-forging, the retaining wedges of the rotor-slots, and the rotor end-rings. Such sustained negative-sequence currents do occasionally flow in the generator armature-circuits, notwithstanding all of the available elaborate fault-clearing means which are used on the electrical system to which the generator is connected. My present invention is desired to make adequate provision for this contingency.

In general terms, my invention provides equipment whereby a polyphase generator, or other synchronous dynamo-electric machine, may be provided with protective apparatus whereby an uncleared or sustained negative-sequence current-flow may be used to provide various protective means, such as alarms, automatic tripping out of the machine, either before the machine is damaged or after the negative-sequence rotor-heating has proceeded to the point where more or less machine-damage is to be expected, with means also, if desired, for providing a record or indication of the total integrated amount of negative-sequence heating-current to which the machine is subjected during any condition of sustained negative-sequence current-flow in the armature.

Figure 1:
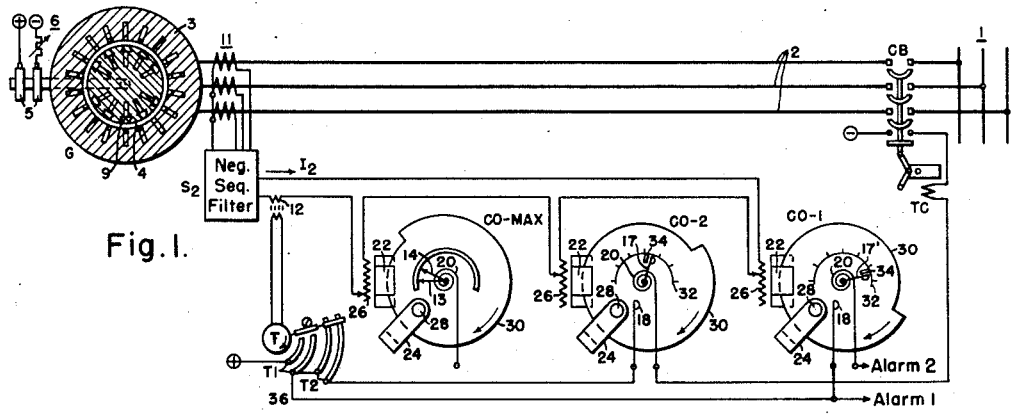
Figure 2:
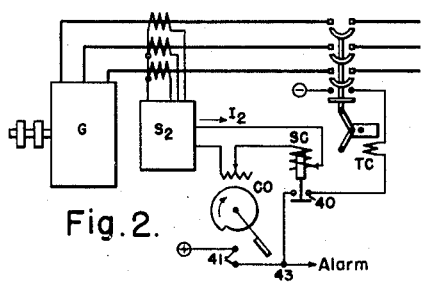
Figure 3:
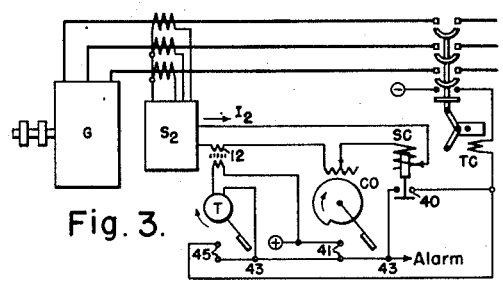
Figure 4:
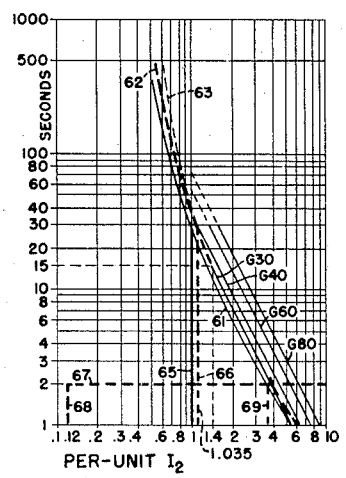
Figure 5:
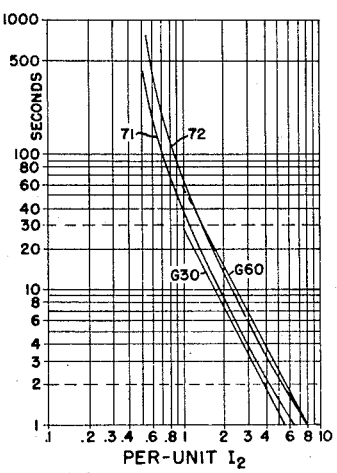
Figure 6:
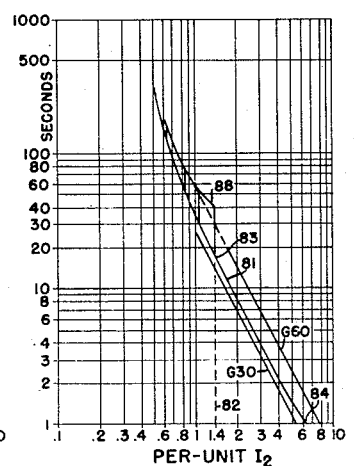
Figure 7:
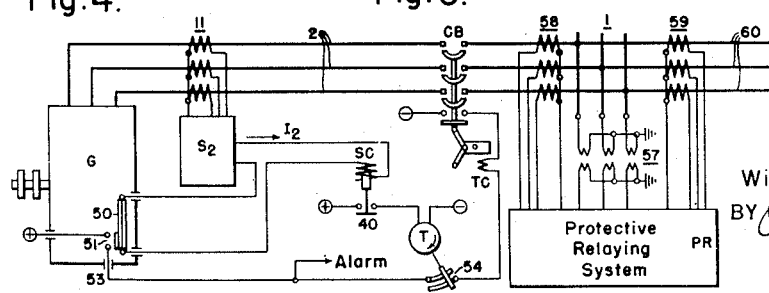

With the foregoing and other objects in view, my invention consists in the circuits, systems, combinations, apparatus, parts, and methods of design and use, as hereinafter described, and illustrated in the accompanying drawing, wherein:

Figure 1 is a diagrammatic and very much simplified showing of circuits and apparatus of a preferred form of embodiment, illustrating various equipments which can be used in carrying out my invention in varying degrees of detail or completeness, omitting such well known or obvious safeguards and refinements which, while they might be used in any practical power-station using my invention, are well understood and are not necessary to an understanding of the novel features of my invention;

Figs. 2 and 3 are similar views, in less detail, showing alternative forms of embodiment of certain features of my invention;

Figs. 4, 5 and 6 are curve-diagrams which will be referred to in the explanation of my invention; and Fig. 7 is another simplified circuit-diagram illustrating still another form of embodiment of the heating-responsive means, and also indicating, by block diagram, the presence of other fault-clearing protective-apparatus which is associated with all electric power systems in which my invention would be used.

Figure 1 shows a three-phase synchronous generator G, or other protected synchronous dynamoelectric machine, which is connected to an electric power system, which is represented by a station bus 1, by means of a set of polyphase generator-terminal conductors 2 and a circuit breaker CB. The synchronous machine G is provided with a polyphase armature-member 3 and a direct-current field-member 4, one of these two members being rotatable relatively to the other, as is well understood. The field-member 4 is illustrated as being the rotor member of the machine, and as being provided with current-collector rings 5, through which a direct-current field-excitation may be applied, as indicated at 6.

When a polyphase generator G, or other synchronous machine, is subjected to unbalanced short-circuit currents, by reason of a fault somewhere out in the buses or power-system to which the machine is connected, a negative-sequence current $I_2$ is caused to flow in the armature windings of the machine, setting up a counter-rotating field-flux which induces double-frequency eddy-currents in the surface areas of the field-member 4. Practically all of the power-loss or heating, which is caused by these negative-sequence armature-currents, take place in the surface-portions of the field-member. Among the most vulnerable spots in the field-member are the slot-closing wedges 9, which, if heated hot enough, will lose their mechanical strength and cause a machine-failure; and even if the heating is not as great as this, other forms of damage may occur in the field member, such as insulation-damage, the welding together of metal parts, and perhaps other forms of damage.

The amount of heat which is introduced in the surface areas of the field member as a result of sustained unbalanced fault-currents is proportional to the integrated value of the product $I_2^2 t$, where $I_2$ is the negative-sequence armature-current and $t$ is the time in seconds. After a relatively small number of seconds, which may be of the order of 10 or 15 seconds, more or less, and which is certainly less than 30 seconds, the hot-spots which are thus produced in the field-member begin radiating sensible amounts of heat to adjoining portions of the field-member, so that, if the negative-sequence currents are small enough, so that the field-member hot-spots do not become damagingly hot in this small number of seconds, the further heating of these hot-spots is no longer approximately exactly proportional to the integrated $I_2^2 t$ value, but the heating proceeds at a lower rate.

A committee of the American Standards Association has recently approved a tentative revision of their rule which expresses the capability of a machine in withstanding sustained negative-sequence currents. This revised rule decrees, with certain safeguards, that the machine shall be capable of withstanding, without injury, an integrated product $I_2^2 t$ equal to 30, in the case of turbine generators, synchronous condensers and frequency-changer sets, and an integrated value equal to 40, in the case of hydraulic turbine-driven generators and engine-driven generators. The tentatively adopted rule states that, above these limits, it may be expected that a machine will suffer varying degrees of damage, so that the committee has recommended that the machine be thereafter removed from service, at an "early" convenient time, for inspection to determine the amount of field-member damage, if any. The rule also indicates that, for integrated limits twice as high as the recommended limits, serious damage should be expected.

In this rule, and throughout the present specification, the negative-sequence armature-current $I_2$ is expressed in per-unit values, that is, in multiples of the rated full-load positive-sequence armature-current of the machine. This rule is applicable to salient-pole machines as well as to cylindrical-field machines, although the problem is frequently thought of primarily in respect to machines in which the field-member is cylindrical and is the rotor-member of the machine, as is shown in Fig. 1.

Some power-system operators may wish to operate their machines so that they will never be subject to rotor-heating damage as a result of sustained or uncleared unbalanced faults. In other words, they will wish to take the machine out of service, whenever the guaranteed integrated limit $I_2^2 t$ is reached, either in the rule as now drafted, or as it may be subsequently amended as a result of further experience. There is a danger, however, in operating a power-system in this way, because of the danger of concatenating out other machines, until there is a substantially complete or widespread system-outage, which is usually so serious as to warrant the taking of a certain amount of risk in order to prevent it. Thus, if all machines are protected so as to be tripped out at the guaranteed limiting integral value of $I_2^2 t$, whenever any one machine trips out it will throw more unbalanced loads on the remaining machines, and they may be expected to promptly trip out also, in very short order.

It is quite probable that many power-system operators will be willing to assume the risk of a small possible amount of machine-damage, in order to avoid the risk of a system-outage, and such operators will want protective relaying equipment which will give them varying degrees of protection, together with warnings of the times when it is reasonable to shut down certain machines which may have possibly been overheated, in order to make a rotor-surface inspection. Such inspections are costly, however, and no power-system operator could afford to undertake too many of them, or to undertake inspections when inspections really are not necessary. It is an important feature of my invention, therefore, that I provide various adjustable means, whereby the different power-station operators may protect their machines in the manner in which their experience or judgment dictates as best, in regard to automatic trippings or warnings as to possible damage from sustained unbalanced faults.

In Fig. 1, by way of example, the generator-terminal conductors 2 are provided with current transformers 11, which energize a negative-sequence filter, or means $S_2$, which substantially segregates and responds to the negative-sequence armature-current $I_2$ of the machine. The $I_2$ output of the negative-sequence filter $S_2$ is used, in Fig. 1, to serially energize, first, a saturating current-transformer 12 which in turn energizes a synchronous timer T; second a maximum-demand integrating intelligence-giving $I_2^2 t$ relay CO–MAX, and finally, two contact-making integrating $I_2^2 t$ relays CO–2 and CO–1, which respond to different values of the integrated product. Not all of these elements need to be used in every system, depending upon the amount and kind of protection which the system-operator wants. Each of these elements is also intended to be symbolic or representative of other equivalent devices which could be substituted therefor, for performing substantially the same essential function or functions. Each element will, therefore, be separately discussed.

The timer T in Fig. 1 is intended to be representative of any timing-means which responds to a predetermined elapsed time or times after the incipience of a negative-sequence current $I_2$ of a magnitude exceeding some small value such as 0.3 per unit, or even less, or after the incipience of some otherwise-detected predetermined unbalanced fault-condition on the generator G or on the system to which the machine is connected. The timer T is shown as having two sets of contacts T1 and T2.

The T1 timer-contacts may be normally or initially open contacts, which close only after the expiration of a short time such as two seconds, or other normal fault-clearing time, after the incipience of the predetermined fault-condition on the machine. This time represents the time during which any fault on the machine or on the system will normally certainly be cleared, so that it is normally not desirable to respond to the integrated negative-sequence heating-constant $I_2^2 t$ of the machine while the fault is being cleared elsewhere on the system.

The second timer-contacts T2 are illustrated in Fig. 1 as being normally or initially closed contacts, which open only after the expiration of 30 seconds, or such longer or shorter time as the system-operator may desire, for the purpose of distinguishing between fault-conditions which may require the immediate automatic tripping of the machine-breaker CB, and faults which can be left for manual clearance on the basis of an alarm or other intelligence which is given to the station-operator at the station where the machine is located.

Most station-operators will need a record of the magnitude of the total integrated heating-constant $I_2^2 t$ to which each machine has been subjected, in the event of an unbalanced fault-condition. The performance of such a function is represented, in Fig. 1, by the maximum-demand integrating current-meter CO–MAX, which is represented, by way of giving an easily understood symbolic representation, as being a self-resetting instrument having an indicating pointer 13, showing integrated values of the quantity $I_2^2 t$, and a second, frictionally held, maximum-demand pointer 14, which is shoved around by the indicating-pointer 13, so as to remain at a point corresponding to the maximum movement of the indicating pointer.

The second integrating current member CO–2, in Fig. 1, is a relay which, instead of having a pointer, is provided with a movable contact 17, which moves, during the response of the relay, until the relay has made a certain preset fraction of a revolution, at which time it makes contact with a stationary contact 18.

The last integrating current-responsive member in Fig. 1 is shown at CO–1. This is a relay which is similar to the relay CO–2, except that its movable contact 17' is adjusted to have a shorter amount of travel, before it makes contact with the stationary contact 18, so that this relay CO–1 responds to a smaller value of the integrated constant than the relay CO–2.

The integrating current-responsive elements CO–MAX, CO–2 and CO–1, in Fig. 1, are intended to be symbolic or representative of any type of current-responsive means, which responds, more or less faithfully, to the integrated constant $I_2^2 t$, particularly during a certain preferred range of operation of the element. In Fig. 1, these elements are represented as being induction-disc elements having very inverse time-characteristics, which may advantageously be of the type which is described and claimed in an application of William K. Sonnemann, Serial No. 274,845, filed March 5, 1952; or any other element, having similar characteristics, could be used, whether of the induction-disc type, or of the thermal type, or any other type which performs substantially the same function.

Referring particularly to the illustrated type of induction-disc elements, with very inverse time-characteristics, which are shown in Fig. 1 at CO–MAX, CO–2 and CO–1, it may be noted that each of these elements is provided with a weak biasing spring 20, which can be adjustable as to spring-strength, if desired, as by means of hub-adjustments on the shaft of the induction-disc element; an electrically excited field-element 22 which develops a torque, in response to $I_2^2$, overcoming the bias of the spring 20; and a strong damping-magnet 24, which opposes the movement of the disc with a force which increases with the velocity of the disc. The electromagnet or field-element 22 is provided with a tapped energizingcoil 26 whereby the taps may be adjusted to cause the relay to respond to any desired minimum closing-current or actuating-current. The damping-magnet 24 may be provided with a screw-plug 28, which may be adjusted toward or away from the disc in order to increase or decrease the effective strength of the damping magnet. The induction-disc itself may be provided with a helically shaped peripheral edge 30, as described in the Sonnemann case, for facilitating the maintenance of a close balance between the spring-bias of the spring 20, and the electromagnetic operating force of the field-element 22.

The two contact-making integrating current-responsive elements CO-2 and CO-1 are each provided with an arcuate time-scale 32, along which a frictionally held back-stop 34 may be adjusted, in order to adjust the distance of movement of the movable contact-member 17 or 17', thus adjusting the time-setting of the element, or the value of the integrated constant to which the element responds.

Fig. 1 shows one typical or illustrative relay-circuit arrangement, making use of the various contacts T1, T2, 17—18, and 17'—18. Thus, from the positive battery-terminal (+), a circuit may be traced first through the timer-contact T1 and then to a conductor 36. This conductor may be used to immediately energize the circuit of an alarm No. 1, using the term "alarm" to include any kind of intelligence-giving means, whether a bell, light, indicator, or record of any type. The relay-conductor 36 may also be connected, through the second timer-contact T2, to the relay-contacts 17—18 of the high-setting integrating element CO-2, so as to energize the circuit of the trip-coil TC of the circuit breaker CB, so as to produce an automatic tripping-operation which disconnects the generator G from the faulted transmission system. The same relay-conductor 36 may also be used to energize the relay-contact 17'—18 of the low-set integrating element CO-1, which may be used to sound an alarm No. 2.

It should be understood, of course, that it is not always necessary to use all of the elements which are shown in Fig. 1, for example, the first timer-contact T1 may be representative of any interlocking means which makes sure that the unbalanced-fault protective-means of my invention, particularly the relay-elements CO-1 and/or CO-2 or their equivalents, shall not be operative during the time when any system-fault is being cleared by the normal fault-clearing means which is always provided for that purpose, and which has nothing to do with my invention, except for the necessary coordination between the respective operating-times. In many systems, perhaps most systems, it is impossible to have a per-unit negative-sequence current $I_2$ of sufficiently high magnitude to cause the integrating current-responsive element CO-1 or CO-2 to reach any integrated value for which it may be set, in a time less than two seconds, or whatever other time is provided for by the closing of the timer-contact T1. In such cases, it is obviously not necessary to provide said timer-contact T1.

The second timer-contact T2 is intended to be representative of any means which will permit the integrating relay CO-2 to perform its automatic tripping-action if it reaches its pre-set integration-limit within 30 seconds, or within whatever other time the timer-contact T2 is set to open. It is obvious that this function might be performed either by measuring the time, and blocking the automatic tripping-function if the required time exceeds a certain specified amount, such as 30 seconds, or the same effect could be obtained by responding to the magnitude of the negative-sequence current $I_2$, and permitting the automatic tripping-action to obtain only in these cases in which the current is large enough to produce the tripping action within the specified time such as 30 seconds.

Thus, as shown in Fig. 2, I provide a single integrating relay, marked CO, I omit the timer T, and I provide an instantaneous or quickly acting overcurrent element SC, having a make-contact 40 which is in series with the CO contact 41. The instantaneous element SC may have a tapped operating coil whereby it can be set to respond to any desired value of the negative-sequence current $I_2$, which is furnished by the filter $S_2$, and this instantaneous current-setting may be chosen to be such that, if the current is large enough to actuate the instantaneous element SC, the current will be large enough to cause the CO-element to close its contact 41 within the specified operating time of 30 seconds, or whatever other value is desired, depending upon the desired point of demarcation between automatic tripping, and merely sounding an alarm. In Fig. 2, the relaying circuit may be traced from the positive battery-terminal (+), through the CO contact 41 to a conductor 43, which energizes an alarm-circuit, and which is also connected, through the SC contact 40, to the circuit of the trip-coil TC.

Fig. 3 shows a modification of the Fig. 2 circuit, whereby a timer T is added, which is not set into operation until the CO-element has closed its contact 41, at the termination of whatever integrated value of the product $I_2{}^2t$ this CO-element is set for. Thereafter, the timer measures a certain short time, which may be 20 or 30 seconds, more or less, or whatever time the station-operator wishes to provide, whereby the station-attendant will have that much more time in which to clear the fault, or the machine, by hand, if the fault is not otherwise cleared in the meantime, before a final tripping-operation will be automatically performed as a result of the closure of the timer-contact 45. This timer-contact 45 is connected in parallel with the overcurrent-contact 40, in Fig. 3, that is, between the conductor 43 and the tripping-circuit. Thus, if the negative-sequence current $I_2$ is large enough to cause the integrating element CO to close its contact 41 within a certain preset time, such as 17 or 18 seconds after the incipience of the fault (by way of example), the tripping-operation will be obtained immediately upon the closure of the integrating-element contact 41, but if the integrating element CO requires a longer time to close its contact 41, then a still further time-delay will be interposed, before a tripping-operation will be obtained through the closure of the timer contact 45 in Fig. 3.

Fig. 7 shows another form of variation of the control-apparatus in accordance with my invention. In this figure, a response to a particular integrated value of the product $I_2{}^2t$ is obtained, not by an induction-disc element or elements, but by a bimetal thermal element 50, which is heated by the negative-sequence current $I_2$, and which may be mounted so that it has a heat-radiation rate similar to that which obtains with respect to the hot-spot field-element temperature of the protected generator G. Thus, the thermal element 50 may have any graduation between a linear response to the integrated product $I_2{}^2t$, or a response which falls off by reason of the heat-radiation from the bimetal element 50, and this can be made, if desired, so that the bimetal element will close its contact 51, either at an $I_2{}^2t$ value which is unaffected by heat-radiation, or at a value which is so affected by heat-radiation that the thermal element will close its contact 50 at the same time when the hot-spot temperature of the machine reaches a predetermined value, whether requiring a short time or long time for this purpose; or the bimetal element may be set, if desired, with such a high heat-radiation rate that, if it does not close its contact 51 fairly quickly, it will lag behind the hot-spot temperature of the machine of the generator G, thus giving the station attendant a longer time to do something manually, before an automatic generator-tripping operation is obtained.

The heat-radiating characteristic of the bimetal element 50 in Fig. 7 may be provided with reference to the ambient atmospheric temperature of the room where the apparatus is located, but preferably it should be responsive to the ambient temperature of the generator G, that is, to the generator-temperature, and hence the generatorloading, just prior to the occurrence of the fault. To this end, the bimetal element 50 would be placed on or within the generator-frame, preferably inside of the frame, as indicated in Fig. 7, where it can be exposed, to any desired degree, to any suitable portion of the recirculating ventilating-fluid within the machine.

In Fig. 7, I also show, by way of example, a different kind of timer T than the previously described synchronous timer which is energized from the negative-sequence current $I_2$ through a saturating current-transformer 12. In Fig. 7, I show an equivalent direct-current timer T, which is energized from the station-battery, under the control of an instantaneous or quick-acting overcurrent element SC which is set to respond to any desired small value of the negative-sequence current $I_2$, such as 0.1 or 0.3 per unit, or any other desirable small value. This may be the same small value of negative-sequence current which may be the minimum operating-current of the other elements of my invention, which I have illustrated in other figures, or the instantaneous element SC in Fig. 7 may be set to respond to a lower minimum overcurrent value than some of the other elements.

In the operation of the unbalanced-fault generator-protecting apparatus of Fig. 7, it will be noted that a closure of the bimetal contact 51 energizes a circuit from the positive battery-terminal (+) to a conductor 53. This conductor may be directly connected to an alarm, as indicated in Fig. 7, and it may be also connected, through a timer-contact 54, to the tripping-circuit which energizes the trip-coil TC. This timer T, in Fig. 7, is set in motion by the sensitive instantaneous element SC, in response to the incipience of a small predetermined magnitude of fault-current, and after a predetermined time-interval, which may be 30 seconds, more or less, as has previously been described, the timer T, in Fig. 7, opens its normally closed contact 54, and thereafter makes it impossible to obtain an automatic tripping-operation in response to any subsequent operation of the bimetal contact 51.

In Fig. 7, I also show, by block diagram, a conventional protective relaying system PR, which is energized, through a set of potential transformers 57, from the station-bus 1, and from two sets of current transformers 58 and 59 on the incoming and outgoing lines from said station-bus 1, that is, from the generator-conductors 2 and the distribution or transmission line 60, respectively. This is intended to be representative or suggestive of the fact, which is common to all forms of embodiment of my invention, that the system to which my protected generator is connected will be provided with suitable fault-responsive means which is designed to segregate any faulted portion of the system, and to do so in a time which does not exceed two seconds or whatever maximum back-up time is provided for in the protective relaying equipment for any particular system. This has nothing to do with my present invention, other than the fact that the minimum operating-time of my present invention should be longer than the maximum fault-clearing time of the protective relaying system of the system, so that any system-fault will have been automatically cleared, if it is going to be automatically cleared, before my unbalanced-fault generator-protection system comes into play.

Figs. 4, 5 and 6 show curve-diagrams which can be referred to in recapitulating the operation, or the various possible modes of operation, of my equipment. In Fig. 4, the lines G30, G40, G60 and G80 show the relation between the response-time and the per unit current $I_2$, for generators reaching a certain predetermined hot-spot temperature when the integrated $I_2{}^2t$ values are 30, 40, 60 and 80, respectively. The dotted portions of these lines, at times beyond the 30-second time, indicate that these portions of the curve are beyond the times contemplated in the standard definition of the machine-capability, as generally understood. On log-log curve-paper, as shown in Fig. 4, these $I_2{}^2t$ generator-curves are straight lines, as shown.

In Fig. 4, the curved line 61 indicates a typical response-curve of a very inverse time-characteristic relay which would be certain to close its contact in a time just under the integrated generator-constant G30, corresponding to $I_2{}^2t$ having an integrated value of 30, at all times up to 30 seconds, after which time the present guaranteed generator-capability definition is generally understood to be inapplicable. It will be noted that the relay-response curve 61 has a straight-line portion, where it parallels the straight-line generator-curve G30, over a certain important range, namely, in the case shown, between about two seconds and 15 seconds operating-time, and between about four per unit current and 1.4 per unit current. It will be understood, of course, that the relay could have been recalibrated and adjusted so that this straight-line portion fell in any desired range. At each end of this straight-line portion, the relay-response curve 61 begins to curve, becoming asymptotic to a line parallel to the time axis at one end, at some low per-unit value of the current, which is the minimum closing or pick-up current of the relay, and a line parallel to the current-axis at the other end of the curve.

Hence, a relay set to have this response-characteristic 61, as shown in Fig. 4, will thus absolutely protect the generator against damage to the field member as a result of sustained negative-sequence armature-currents, during the time-range of 30 seconds during which the guaranteed definition is commonly understood to be applicable. The high-current portions of Fig. 4, beyond about five or six per-unit values, may be disregarded, as no system can supply such high negative-sequence currents.

However, it is also known that the guaranteed capability-response, to an integrated value of 30, for most machines (or 40, for other machines), is too conservative at times of the order of 30 seconds. It would be but a slight risk to a station-operator, if he cared to take the chance, to set his relay so that its straight-line portion would be coincident with (not parallel to) the generator-characteristic, such as G30 in Fig. 4, throughout a considerable range, such as the range between about 4 per unit current and about 1.4 per unit current, or between approximate times of $t=2$ seconds and $t=15$ seconds. To do this, the operator could set his relay to have a curve-characteristic such as is shown by the heavy dotted line 62 in Fig. 4, where it branches away from the generator-curve G30, at the upper end, at times beyond 15 seconds, and at the lower end, at times less than 2 seconds (if it is possible to have any such times less than 2 seconds).

As a still further alternative, the station-operator, if he wishes to take a still further slight chance, which would not be much of a risk, could reset his relay, for instance, with a somewhat stronger spring-tension of the spring 20, so as to make the curve curve up still more steeply at the low-current responses, as indicated by the curve 63 in Fig. 4.

In Fig. 4, automatic tripping-operations at times exceeding 30 seconds, for example, could be prevented by means of a timing element which responded at the time corresponding to 30 seconds, or by an overcurrent element which responded to the corresponding current-values on the curves. Thus, if the relay-curve 61 was being used, the overcurrent element could be set for 1 per unit current, as indicated by the heavy vertical line 65; or if the curve 62 were being used, then an overcurrent element could be used, set for a response to a current of 1.035 per unit, as indicated by the dotted vertical line 66. In like manner, if the possibility of extremely heavy negative-sequence currents made it desirable to prevent a relay-response in times less than two seconds, that could be done by a timer which responded in two seconds, as indicated by the dotted horizontal line 67, and this timer would begin to respond as soon as the current reached a certain minimum value which might, just by way of giving an example, be 0.12 per unit, as indicated by the vertical line 68. Or, instead of using a two-second timer to block the generator-protection apparatus, a corresponding current-response could be used, as indicated by the vertical line 69 in Fig. 4.

Fig. 5 shows another way in which my invention can be very advantageously used, assuming that the station-operator is willing to let his machine operate a little bit up into the region where some hot-spot damage may be expected, as a result of sustained negative-sequence currents, and also taking advantage of the fact that, if a severe negative-sequence fault-current has to be cleared in 15 or 20 seconds, or even 30, it will have to be done automatically, as the station-operator cannot be expected to be able to do anything manually about the condition, in that short a time. On the other hand, if the fault is not quite so severe, so that 15 or 20 seconds have elapsed, or even 30 seconds, without obtaining a response to an integration constant of the product $I_2{}^2t$, then it is reasonable to suppose (by reason of the effect of heat-dissipation from the hot-spot of the machine), that the machine can hang on for just a little bit longer, without damage which is too serious, so that an immediate tripping-operation would not be required.

Thus, in Fig. 5, if the machine has a guaranteed capability corresponding to the curve G30, or an integrated value of $I_2{}^2t=30$, and if it is desired to operate in the region between such a characteristic and the 200% characteristic which is represented by the generator-curve G60, or an integrated value of $I_2{}^2t=60$, then the first induction-disc element, such as CO–1, in Fig. 1, could be set to have a response characteristic such as the curve 71 in Fig. 5, slightly higher than the G30 curve, while the second induction-disc element, such as the element CO–2 of Fig. 1, could be set to have a response-characteristic such as is shown by the curve 72 in Fig. 5, which is somewhat below the 200% curve G60. If the timer T of Fig. 1 were used, it could be set for the responses at 2 seconds and 30 seconds, respectively, as indicated by the horizontal dotted lines in Fig. 5, or the equivalent current-responses could be used, as explained in connection with Fig. 4.

Fig. 6 depicts the kind of operation which could be obtained from the equipment shown in Fig. 3. In Fig. 6, it is again assumed that the guaranteed generator capability on unbalanced currents is represented by the line G30, corresponding to the integrated value $I_2{}^2t=30$. The CO relay in Fig. 3 could be set to have a response-characteristic represented by the line 81, which is somewhat higher than the curve G30. The instantaneous overcurrent element SC could be set to respond to a current of 1.4 per unit, as indicated by the dotted vertical line 82. For all currents equal to 1.4 per unit or higher, instantaneous tripping could be permitted as soon as the CO relay of Fig. 3 closed its contact, or between the points 83 and 84 on curve 81.

The point 83 in Fig. 6, representing the intersection of the curves 81 and 82, occurs at some such time as 17 or 18 seconds, which has been chosen merely by way of example, since the adjustable features of my relay make it possible for the station-operator to choose this point 83 to suit himself. If, at any time longer than this time-interval of 17 or 18 seconds, the CO relay of Fig. 3 should respond, it would only sound an alarm, and it would start the timer T of Fig. 3, which would add a certain number of seconds, say 23 seconds (simply by way of giving an example), this time being determinable by the station-operator; and instantaneous tripping would not then be obtained until 23 seconds after the operation of the CO element, as indicated by the curve 88 in Fig. 6. Thus, the station-attendant is given these extra 23 seconds in which to manually clear the trouble, if it is possible for him to do so, before an automatic generator-tripping operation will be obtained.

In all installations using my invention, it may, or may not, be necessary or desirable to use some sort of maximum-trouble indicator or recorder, such as is shown at CO–MAX in Fig. 1. It is believed that such information would be of such great value to the station-operator that it would be well worth the cost of the extra element to obtain it. From this information, or from his alarm-system in cases where an alarm is sounded without causing an immediate automatic tripping-operation, the station-operator can use his own judgment (according to the setting of his various relay-elements), as to whether it is going to be worth the expense of shutting down a generator to examine it for possible field-element damage, in the event of either an alarm or an automatic tripping-operation as a result of the protective equipment which is provided in accordanse with my present invention.

In all cases, it is to be well understood that there are many ancillary protective features, such as relay-circuit fuses and many details of operational responses which would very likely want to be used, but which I have not shown or discussed, as being beyond the scope of the novel features of my present invention. Thus, my invention contemplates the use of additional features, as well as the omission of some of the features which I have shown and discussed, and it also contemplates the substitution of various equivalent devices for the elements which I have chosen to illustrate.

I claim as my invention:

1. Mechanism which is useful in the protection of a polyphase synchronous machine against harmful effects of negative-sequence armature-current $I_2$, said mechanism comprising a negative-sequence means for substantially segregating and responding to the negative-sequence armature-current $I_2$ of the machine, and an integrating relaying-means, energized from said negative-sequence means, for responding to the integrated product of the two factors $I_2{}^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine.

2. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying-means, energized from said negative-sequence means, for responding to the integrated product of the two factors $I_2{}^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine; an auxiliary limiting relay-means, responsive to one of said two factors at a value corresponding to conditions which cause said machine-capability to be exceeded in a relatively small number of seconds, for effecting a circuit-controlling action which is supplementary to that of said circuit-controlling means of the integrating relaying-means; and circuit-means for providing a first control-circuit under the control of both said integrating relaying-means and said auxiliary limiting relay-means, and also a second control-circuit under the control of said integrating relaying-means but not under the control of said auxiliary limiting relay-means.

3. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; and integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine, an auxiliary limiting relay-means which is responsive to the elapse of a particular amount of time after the incipience of a predetermined fault-condition on the machine; and circuit-means for providing a first control-circuit under the control of both said integrating relaying-means and said auxiliary limiting relay-means, and also a second control-circuit under the control of said integrating relaying--means but not under the control of said auxiliary limiting relay-means.

4. Mechanism which is useful in the protection of a polyphase synchronous machine against harmful effects of negative-sequence armature current $I_2$, said mechanism comprising: a negative-sequence means for substantially segregating and responding to the negative-sequence armature-current $I_2$ of the machine; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine, an auxiliary limiting relay-means which is responsive to the elapse of a particular amount of time after the incipience of a negative-sequence current $I_2$ of a magnitude exceeding a small minimum value; and circuit-means for providing a first control-circuit under the control of both said integrating relaying-means and said auxiliary limiting relay-means, and also a second control-circuit under the control of said integrating relaying-means but not under the control of said auxiliary limiting relay-means.

5. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative sequence armature-current $I_2$ in the machine, an auxiliary limiting relay-means which is relatively quickly responsive to a particular value of the negative-sequence current $I_2$; and circuit-means for providing a first control-circuit under the control of both said integrating relaying-means and said auxiliary limiting relay-means, and also a second control-circuit under the control of said integrating relaying-means but not under the control of said auxiliary limiting relay-means.

6. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying-means which includes means for giving two contact-controlling responses, to different values of the $I_2^2 t$ integral, where $t$ is time in seconds, said values being so related to machine-capability as to be useful in affording the machine two different useful and desirable degrees of protection against the harmful effects of sustained negative-sequence armature-current $I_2$; an auxiliary limiting relay-means, responsive to one of said two factors at a value corresponding to conditions which cause said machine-capability to be exceeded in a relatively small number of seconds, for effecting a circuit-controlling action which is supplementary to that of the integrating relaying-means; and circuit-means for providing a first control-circuit under the control of both the higher-limit response of the integrating relaying-means and a response of the auxiliary limiting relay-means, and also a second control-circuit under the control of the lower-limit response of the integrating relaying-means but not under the control of a response of the auxiliary limiting relay-means.

7. Mechanism which is useful in the protection of a polyphase synchronous machine against harmful effects of negative-sequence armature-current $I_2$, said mechanism comprising a negative-sequence means for substantially segregating and responding to the negative-sequence armature-current $I_2$ of the machine, and an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine, said integrating relaying-means having a time-responsive variation, in its response-characteristic, corresponding approximately to the greater capabilties of the machine for negative-sequence currents $I_2$ which may be endured for somewhat longer than a relatively small number of seconds.

8. Mechanism which is useful in the protection of a polyphase synchronous machine against harmful effects of negative-sequence armature-current $I_2$, said mechanism comprising a negative-sequence means for substantially segregating and responding to the negative-sequence armature-current $I_2$ of the machine, and an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine, said integrating relaying-means being responsive only upon the incipience of a negative-sequence current $I_2$ having a magnitude exceeding a small minimum value.

9. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine; and a minimum-time relay-means for blocking a circuit-controlling action of the circuit-controlling means of the integrating relaying-means prior to the expiration of a normal fault-clearing time after the incipience of a predetermined fault-condition on the machine.

10. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine; and a maximum-demand integrating intelligence-giving means, energized from said negative-sequence means, for giving intelligence concerning the magnitude of the integrated product $I_2^2 t$ to which the machine is subjected during any period of the sustained flow of a negative-sequence current $I_2$ of a magnitude exceeding a small minimum value.

11. Mechanism which is useful in the protection of a polyphase synchronous machine against harmful effects of negative-sequence armature-current $I_2$, said mechanism comprising: a negative-sequence means for substantially segregating and responding to the negative-sequence armature-current $I_2$ of the machine; an integrating relaying means, energized from said negative-sequence means, for respondnig to the integrated product of the two factors $I_2^2$ and $t$, where $t$ is time in seconds, said integrating relaying-means including a circuit-controlling means for altering the conductivity of a circuit which is operative at an integrated value which is so related to the machine-capability as to be useful in affording protection against the harmful effects of sustained negative-sequence armature-current $I_2$ in the machine; and a time-delay means, responsive to an operation of said integrating relaying-means, for effecting a circuit-controlling action in response to the elapse of a particular amount of time after the operation of said integrating relaying-means.

12. Mechanism which is useful in the protection of a set of polyphase conductors against harmful effects of negative-sequence current $I_2$ therein, said mechanism comprising a negative-sequence means for substantially segregating and responding to the negative-sequence current $I_2$ of said set of polyphase conductors, and an integrating relaying-means, energized from said negative-sequence means, for responding to the integrated product of the two factors $I_2^2$ and $t$, where $t$ is time in seconds, said integrating relaying-means including a means for altering the conductivity of a circuit controlling contact which is operative at a predetermined integrated value.

13. Mechanism which is useful in the protection of a set of polyphase conductors against harmful effects of negative-sequence current $I_2$ therein, said mechanism comprising a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means, responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; and circuit-means for providing a first control-circuit under the control of both said integrating relaying-means and said auxiliary limiting relay-means, and a second control-circuit under the control of said integrating relaying-means but not under the control of said auxiliary limiting relay-means.

14. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means which is responsive to the elapse of a particular amount of time after the incipience of a predetermined fault-condition on said set of polyphase conductors; and circuit-means for providing a first control-circuit under the control of both said integrating relaying-means and said auxiliary limiting relay-means, and a second control-circuit under the control of said integrating relaying-means but not under the control of said auxiliary limiting relay-means.

15. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means which is responsive to the elapse of a particular amount of time after the incipience of a negative-sequence current $I_2$ of a magnitude exceeding a small minimum value; and circuit means for providing a first control-circuit under the control of both said integrating relaying-means and said auxiliary limiting relay-means, and a second control-circuit under the control of said integrating relaying-means but not under the control of said auxiliary limiting relay-means.

16. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means which is relatively quickly responsive to a particular value of the negative-sequence current $I_2$; and circuit means for providing a first control-circuit under the control of both said integrating relaying-means and said auxiliary limiting relay-means, and a second control-circuit under the control of said integrating relaying-means but not under the control of said auxiliary limiting relay-means.

17. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value, said integrating relaying-means having a predetermined time-responsive variation, in its response-characteristic, for negative-sequence currents which endure for somewhat longer than a small number of seconds; an auxiliary limiting relay-means responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; and circuit-means for providing a first control-circuit under the control of both said integrating relaying-means and said auxiliary limiting relay-means, and a second control-circuit under the control of said integrating relaying-means but not under the control of said auxiliary limiting relay-means.

18. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means which includes means for giving two contact-controlling responses, to different values of the $I_2^2 t$ integral, where $t$ is time in seconds, said values being so related as to be useful in affording two different degrees of protection against the harmful effects of sustained negative-sequence current $I_2$; an auxiliary limiting relay-means, responsive to one of said two factors at a value corresponding to conditions which cause said predetermined integrated value to be reached in a relatively small number of seconds, for effecting a circuit-controlling function which is supplementary to that of the integrating relaying-means; and circuit means for providing a first control-circuit under the control of both the higher-limit response of the integrating relaying-means and a response of the auxiliary limiting relay-means, and also a second control-circuit under the control of the lower-limit response of the integrating relaying-means but not under the control of a response of auxiliary limiting relay-means.

19. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value, said integrating relaying-means being responsive only upon the incipience of a negative-sequence current $I_2$ having a magnitude exceeding a small minimum value; an auxiliary limiting relay-means, responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; and circuit-means for providing a first control-circuit under the control of both said integrating relaying-means and said auxiliary limiting relay-means, and a second control-circuit under the control of said integrating relaying-means but not under the control of said auxiliary limiting relay-means.

20. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means, responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; circuit means for providing a first control-circuit under the control of both said integrating relaying-means and said auxiliary limiting relay-means, and a second control circuit under the control of said integrating relaying-means but not under the control of said auxiliary limiting relay-means; and a minimum-time relay-means for blocking a circuit-controlling action of the circuit-controlling means of the integrating relaying-means after the elapse of a predetermined time after the incipience of a predetermined fault-condition on said set of polyphase conductors.

21. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means, responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; circuit-means for providing a first control-circuit under the control of both said integrating relaying-means and said auxiliary limiting relay-means, and a second control-circuit under the control of said integrating relaying-means but not under the control of said auxiliary limiting relay-means; and a maximum-demand integrating intelligence-giving means, energized from said negative-sequence means, for giving intelligence concerning the magnitude of the integrated product $I_2^2 t$ to which the set of polyphase conductors is subjected during any period of the sustained flow of a negative-sequence current $I_2$ of a magnitude exceeding a small minimum value.

22. Mechanism which is useful in the protection of a set of polyphase conductors against harmful effects of negative-sequence current $I_2$ therein, said mechanism comprising: a negative-sequence means for substantially segregating and responding to the negative-sequence current $I_2$ of said set of polyphase conductors; an integrating relaying-means, energized from said negative-sequence means, for responding to the integrated product of the two factors $I_2^2$ and $t$, where $t$ is time in seconds, said integrating relaying-means including a circuit-controlling means for altering the conductivity of a circuit which is operative at a predetermined integrated value; an auxiliary limiting relay-means, responsive to one of said two factors at a value corresponding to conditions which cause said predetermined integrated value to be reached in a relatively small number of seconds, for effecting a circuit-controlling function which is supplementary to that of said circuit-controlling means of the integrating relaying-means; circuit-means for providing a first control-circuit under the control of both said integrating relaying-means and said auxiliary limiting relay-means, and a second control-circuit under the control of said integrating relaying-means but not under the control of said auxiliary limiting relay-means; and a time-delay means, responsive to an operation of said integrating relaying-means, for effecting a circuit-controlling action in response to the elapse of a particular amount of time after the operation of said integrating relaying-means.

References Cited in the file of this patent
UNITED STATES PATENTS

| | | |
|---|---|---|
| 1,674,477 | May | June 19, 1928 |
| 1,752,947 | Genkin | Apr. 1, 1930 |
| 2,066,932 | Evans | Jan. 5, 1937 |
| 2,376,830 | Sonnemann | May 22, 1945 |